United States Patent
Kawata (10) Patent No.: US 10,462,317 B2
(45) Date of Patent: Oct. 29, 2019

(54) IMAGE READING APPARATUS (71) Applicant: PFU LIMITED, Ishikawa (JP)

(72) Inventor: Kengo Kawata, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 16/045,684

(22) Filed: Jul. 25, 2018

(65) Prior Publication Data

US 2019/0297208 A1 Sep. 26, 2019

(30) Foreign Application Priority Data

Mar. 20, 2018 (JP) .................................. 2018-052020

(51) Int. Cl.
*H04N 1/00* (2006.01)

(52) U.S. Cl.
CPC ..... *H04N 1/00612* (2013.01); *H04N 1/00602* (2013.01); *H04N 1/00649* (2013.01)

(58) Field of Classification Search
CPC ........... H04N 1/00578; H04N 1/00572; H04N 1/0058; H04N 1/00602; H04N 1/12; H04N 1/00612; H04N 1/00005; H04N 1/0005; H04N 1/00063; H04N 1/00068; H04N 1/00082; H04N 1/00233; H04N 1/00575; H04N 1/00596; H04N 1/00633; H04N 1/00649; H04N 1/00687; H04N 1/00806; H04N 1/193; H04N 2201/0082; H04N 2201/0091; H04N 2201/044; B65H 2511/11; B65H 2513/42; B65H 2220/01; B65H 2220/02; B65H 2801/06; B65H 2301/3332; B65H 2801/39; B65H 29/58; B65H 29/64; B65H 43/00; B65H 7/02; B65H 7/20; B65H 85/00; B65H 2301/4212; B65H 2301/446; B65H 2301/51256; B65H 2301/5144; B65H 2301/517; B65H 2404/6111; B65H 2404/742; B65H 2405/1114; B65H 2405/11151;
(Continued)

(56) References Cited

U.S. PATENT DOCUMENTS 5,024,431 A * 6/1991 Shimizu ................. B65H 5/062
271/263
10,029,489 B2 * 7/2018 Nakahata ................... B41J 3/60
(Continued)

FOREIGN PATENT DOCUMENTS

JP 2008-270954 A 11/2008
JP 2012-100115 A 5/2012

*Primary Examiner* — Negussie Worku
(74) *Attorney, Agent, or Firm* — McDermott Will & Emery LLP (57) ABSTRACT

An image reading apparatus includes a reading unit configured to read an image of a medium fed through a first feed path, a switching unit that isolates a third feed path from a junction so as to guide the medium from a second feed path to the first feed path when being disposed at a first position and that guides the medium from the first feed path to the third feed path when being disposed at the second position, and a drive unit that moves the switching unit to the second position when the medium is fed from the first feed path to the third feed path, wherein the drive unit moves the switching unit to the first position after a lapse of predetermined time from a beginning of feeding the medium from the third feed path toward the first feed path.

5 Claims, 8 Drawing Sheets (58) Field of Classification Search
CPC .... B65H 2405/1142; B65H 2405/1412; B65H 2406/122; B65H 2406/35; B65H 2406/3511; B65H 2406/364; B65H 2701/132; B65H 29/52; B65H 31/02; B65H 5/062; G03G 15/602; G03G 15/6552; B41J 11/0085; B41J 13/106
USPC .......................................... 358/498, 497, 496
See application file for complete search history.

(56) References Cited

U.S. PATENT DOCUMENTS

| | | | | |
|---|---|---|---|---|
| 2007/0085258 | A1* | 4/2007 | Iwago | H04N 1/00572 |
| | | | | 271/3.14 |
| 2007/0257422 | A1* | 11/2007 | Suzuki | H04N 1/00572 |
| | | | | 271/225 |
| 2008/0259414 | A1* | 10/2008 | Kitagawa | H04N 1/00567 |
| | | | | 358/498 |
| 2012/0314263 | A1* | 12/2012 | Kawata | H04N 1/10 |
| | | | | 358/474 |
| 2013/0293929 | A1* | 11/2013 | Kakutani | H04N 1/00005 |
| | | | | 358/3.24 |
| 2013/0335787 | A1* | 12/2013 | Kawata | H04N 1/02815 |
| | | | | 358/474 |
| 2014/0320940 | A1* | 10/2014 | Ino | H04N 1/00572 |
| | | | | 358/498 |
| 2015/0189111 | A1* | 7/2015 | Otsuki | H04N 1/00575 |
| | | | | 358/1.12 |
| 2017/0120632 | A1* | 5/2017 | Nakahata | B41J 3/60 |

* cited by examiner

IMAGE READING APPARATUS

CROSS-REFERENCE TO RELATED APPLICATION

The application is based upon and claims the benefit of priority of the prior Japanese Patent Application No. 2018-052020 filed in Japan on Mar. 20, 2018, the entire contents of which are incorporated herein by reference.

FIELD

The technology of the present disclosure relates to an image reading apparatus.

BACKGROUND

There is known an image reading apparatus provided with two feed paths and configured to feed a medium to an appropriate feed path depending on a type of the medium so as to read an image of the medium (see Japanese Laid-open Patent Publication No. 2008-270954). Such an image reading apparatus is provided with a flap that switches the feed paths so that the medium is guided to the appropriate feed path.

However, in such an image reading apparatus, a flap may interfere with a medium, causing a trouble in the medium at the time of what is called "switchback feed" in which a feeding direction of the medium is switched in the middle of feeding.

SUMMARY

According to an aspect of an embodiment, an image reading apparatus includes a junction where a first feed path, a second feed path, and a third feed path join together, a reading unit that reads an image of a medium fed through the first feed path, a switching unit that isolates the third feed path from the junction so as to guide the medium from the second feed path to the first feed path when being disposed at a first position and that guides the medium from the first feed path to the third feed path when being disposed at the second position, and a drive unit that moves the switching unit to the second position when the medium is fed from the first feed path to the third feed path, wherein the drive unit moves the switching unit to the first position after a lapse of predetermined time from a beginning of feeding the medium from the third feed path toward the first feed path.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the disclosure will be explained with reference to accompanying drawings. Hereinafter, an image reading apparatus according to an aspect of the present disclosure will be explained with reference to the drawings. It should be noted that the technology of the present disclosure is not limited by the following description. Hereinafter, the same reference numerals are given to the same components, and redundant explanations are omitted.

First Embodiment

Figure 1:
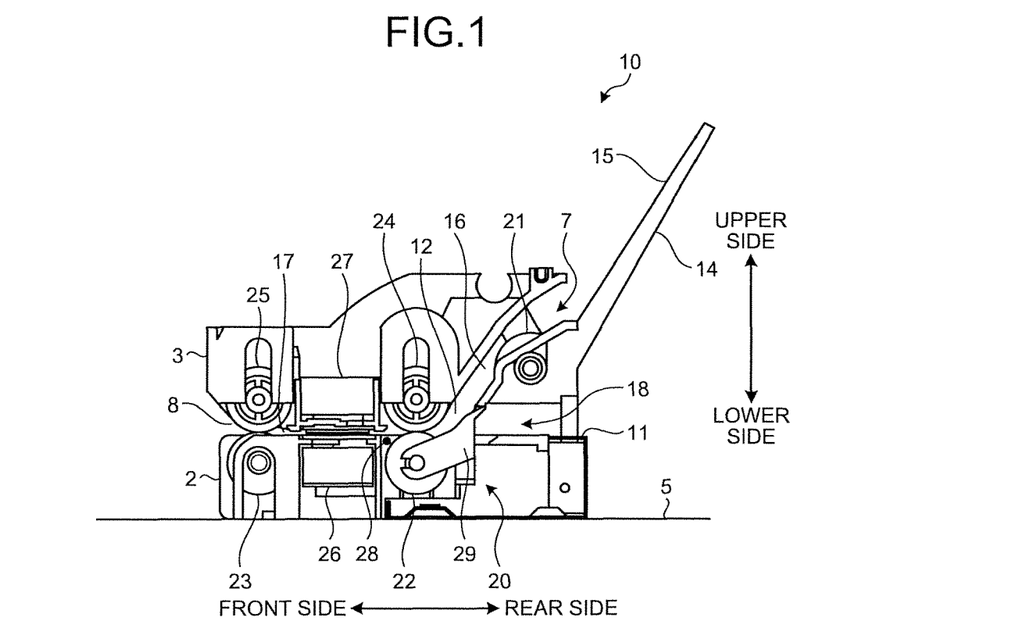
FIG. 1 is a sectional side view of an image reading apparatus according to a first embodiment.

FIG. 1 is a sectional side view of an image reading apparatus according to a first embodiment. As illustrated in FIG. 1, an image reading apparatus 10 includes a lower frame 2 and an upper frame 3. The lower frame 2 is disposed on and fixed to an installation surface 5 in which the image reading apparatus 10 is installed. The upper frame 3 is disposed on an upper part of the lower frame 2 and fixed to the lower frame 2.

The image reading apparatus 10 is formed with a separated port 7, an unseparated port 8, a rear port 11, and a junction 12. The separated port 7 is formed on the rear side of the image reading apparatus 10 and disposed between the lower frame 2 and the upper frame 3. The unseparated port 8 is formed on the front side which is opposite to the rear side where the separated port 7 of the image reading apparatus 10 is formed, and the unseparated port 8 is disposed between the lower frame 2 and the upper frame 3. The unseparated port 8 is formed at a position on the lower side closer to the installation surface 5 than the position where the separated port 7 is formed. The rear port 11 is formed at a position on the rear side of the image reading apparatus 10 closer to the installation surface 5 than the separated port 7 so that a distance from the installation surface 5 to the rear port 11 is equivalent to a distance from the installation surface 5 to the unseparated port 8. The junction 12 is formed between the unseparated port 8 and the rear port 11 and disposed between the lower frame 2 and the upper frame 3. The junction 12 is formed so that a distance from the installation surface 5 to the junction 12 is equivalent to a distance from the installation surface 5 to the unseparated port 8 or to the rear port 11.

The image reading apparatus 10 further includes a hopper 14. The hopper 14 is formed with a placement surface 15.

The hopper 14 is disposed so that the placement surface 15 faces obliquely upward and that an angle formed by a plane along the placement surface 15 and a plane along the installation surface 5 is substantially equal to 55 degrees. Furthermore, the hopper 14 is arranged close to the separated port 7 and fixed to the lower frame 2 so that a medium placed on the placement surface 15 moves toward the separated port 7 by gravity.

The image reading apparatus 10 further includes a medium separating-feed path 16, a medium reading-feed path 17, and a medium drawing-feed path 18. The medium separating-feed path 16 is disposed between the lower frame 2 and the upper frame 3. The medium separating-feed path 16 connects the separated port 7 and the junction 12 and is inclined relative to a plane along which the installation surface 5 is disposed so that an end close to the junction 12 is disposed below an end close to the separated port 7. The medium reading-feed path 17 is formed along another plane parallel to the plane along which the installation surface 5 is disposed, and the medium reading-feed path 17 is disposed between the lower frame 2 and the upper frame 3, being configured to connect the unseparated port 8 and the junction 12. The medium drawing-feed path 18 is formed along the plane along which the medium reading-feed path 17 is disposed, and the medium drawing-feed path 18 is disposed inside the lower frame 2, being configured to connect the rear port 11 and the junction 12.

The image reading apparatus 10 further includes a feed unit 20. The feed unit 20 includes a separation unit 21, a first transporting roller 22, a second transporting roller 23, a first pressure roller 24, and a second pressure roller 25. The separation unit 21 is formed in the middle of the medium separating-feed path 16. From a plurality of media inserted into the medium separating-feed path 16 through the separated port 7, the separation unit 21 separates one medium that is in contact with the placement surface 15 of the hopper 14 and feeds the separated media to the junction 12 from the separated port 7 through the medium separating-feed path 16.

The first transporting roller 22 is formed in a columnar shape. The first transporting roller 22 is disposed on the lower side of the medium reading-feed path 17 and is rotatably supported by the lower frame 2. Rotating in the normal direction (counterclockwise in FIG. 1), the first transporting roller 22 feeds the medium disposed in the medium reading-feed path 17 from the junction 12 toward the unseparated port 8. The second transporting roller 23 is disposed between the first transporting roller 22 and the unseparated port 8 on the lower side of the medium reading-feed path 17, being rotatably supported by the lower frame 2. Rotating in the normal direction (counterclockwise in FIG. 1), the second transporting roller 23 feeds the medium disposed in the medium reading-feed path 17 from the junction 12 toward the unseparated port 8.

The first pressure roller 24 is formed in a columnar shape. The first pressure roller 24 is disposed on the upper side of the medium reading-feed path 17 and on the upper side of the first transporting roller 22. The first pressure roller 24 is supported by the upper frame 3 rotatably and translatably in a vertical direction perpendicular to the plane along the installation surface 5. The first pressure roller 24 presses the medium disposed in the medium reading-feed path 17 against the first transporting roller 22 and rotates in the normal direction (clockwise in FIG. 1) so as to feed the medium disposed in the medium reading-feed path 17 from the junction 12 toward the unseparated port 8.

The second transporting roller 23 is formed in a columnar shape. The second transporting roller 23 is disposed between the first transporting roller 22 and the unseparated port 8 on the lower side of the medium reading-feed path 17, being rotatably supported by the lower frame 2. Rotating in the normal direction (counterclockwise in FIG. 1), the second transporting roller 23 feeds the medium disposed in the medium reading-feed path 17 from the junction 12 toward the unseparated port 8.

The second pressure roller 25 is formed in a columnar shape and has a diameter equal to that of the second transporting roller 23. The second pressure roller 25 is disposed on the upper side of the medium reading-feed path 17 and on the upper side of the second transporting roller 23. The second pressure roller 25 is supported by the upper frame 3 rotatably and translatably in the vertical direction. The second pressure roller 25 presses the medium disposed in the medium reading-feed path 17 against the second transporting roller 23 and rotates in the normal direction (clockwise in FIG. 1) so as to feed the medium disposed in the medium reading-feed path 17 from the junction 12 toward the unseparated port 8.

The image reading apparatus 10 further includes a lower reading unit 26 and an upper reading unit 27. The lower reading unit 26 is disposed on the lower side of the medium reading-feed path 17 and is disposed between the first transporting roller 22 and the second transporting roller 23. The lower reading unit 26 reads an image on the lower surface of the medium fed through the medium reading-feed path 17. On the upper side of the medium reading-feed path 17, the upper reading unit 27 is disposed on the upper side of the lower reading unit 26 and between the first pressure roller 24 and the second pressure roller 25. The upper reading unit 27 reads an image on the upper surface of the medium fed through the medium reading-feed path 17.

The image reading apparatus 10 further includes a medium position detection sensor 28. The medium position detection sensor 28 is disposed on the lower side of the medium reading-feed path 17 and is disposed between the first transporting roller 22 and the lower reading unit 26. The medium position detection sensor 28 detects whether a medium is disposed at a medium detection position between the first transporting roller 22 and the lower reading unit 26 in the medium reading-feed path 17 and detects the timing when an edge of the medium passes through the medium detection position.

The image reading apparatus 10 further includes a feed path-switching flap 29. The feed path-switching flap 29 is disposed at the junction 12 and is rotatably supported by the lower frame 2, sharing a pivot with the first transporting roller 22 so that the feed path-switching flap 29 is disposed at a separation feed position and at a switchback feed position. Being disposed at the separation feed position, the feed path-switching flap 29 isolates the medium drawing-feed path 18 from the junction 12 and guides, to the medium reading-feed path 17, a medium fed from the separated port 7 to the junction 12 through the medium separating-feed path 16.

Figure 2:
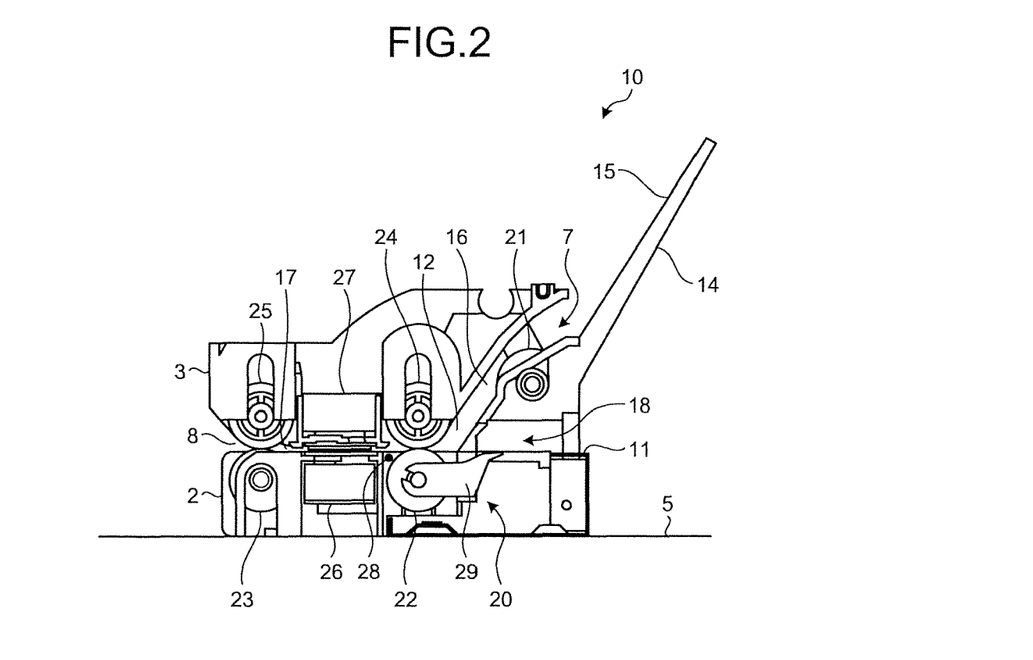
FIG. 2 is a sectional side view of the image reading apparatus when a feed path-switching flap is disposed at a switchback feed position.

FIG. 2 is a sectional side view of the image reading apparatus 10 when the feed path-switching flap 29 is disposed at the switchback feed position. Rotating in the reverse direction (clockwise in FIG. 2) from the separation feed position, the feed path-switching flap 29 is disposed at the switchback feed position as illustrated in FIG. 2. Being disposed at the switchback feed position, the feed path-switching flap 29 connects the junction 12 with the medium drawing-feed path 18 and guides, to the medium drawing-feed path 18, a medium fed from the unseparated port 8 to the junction 12 through the medium reading-feed path 17. Being disposed at the switchback feed position, the feed path-switching flap 29 comes into contact with a part of the lower frame 2 and is restricted from moving so as not to rotate in the reverse direction from the switchback feed position.

Rotating in the normal direction (counterclockwise in FIG. 2) from the switchback feed position, the feed path-switching flap 29 is disposed at the separation feed position (see FIG. 1). Being disposed at the separation feed position, the feed path-switching flap 29 comes into contact with a part of the upper frame 3 and is restricted from moving so as not to rotate further in the normal direction from the separation feed position.

Figure 3:
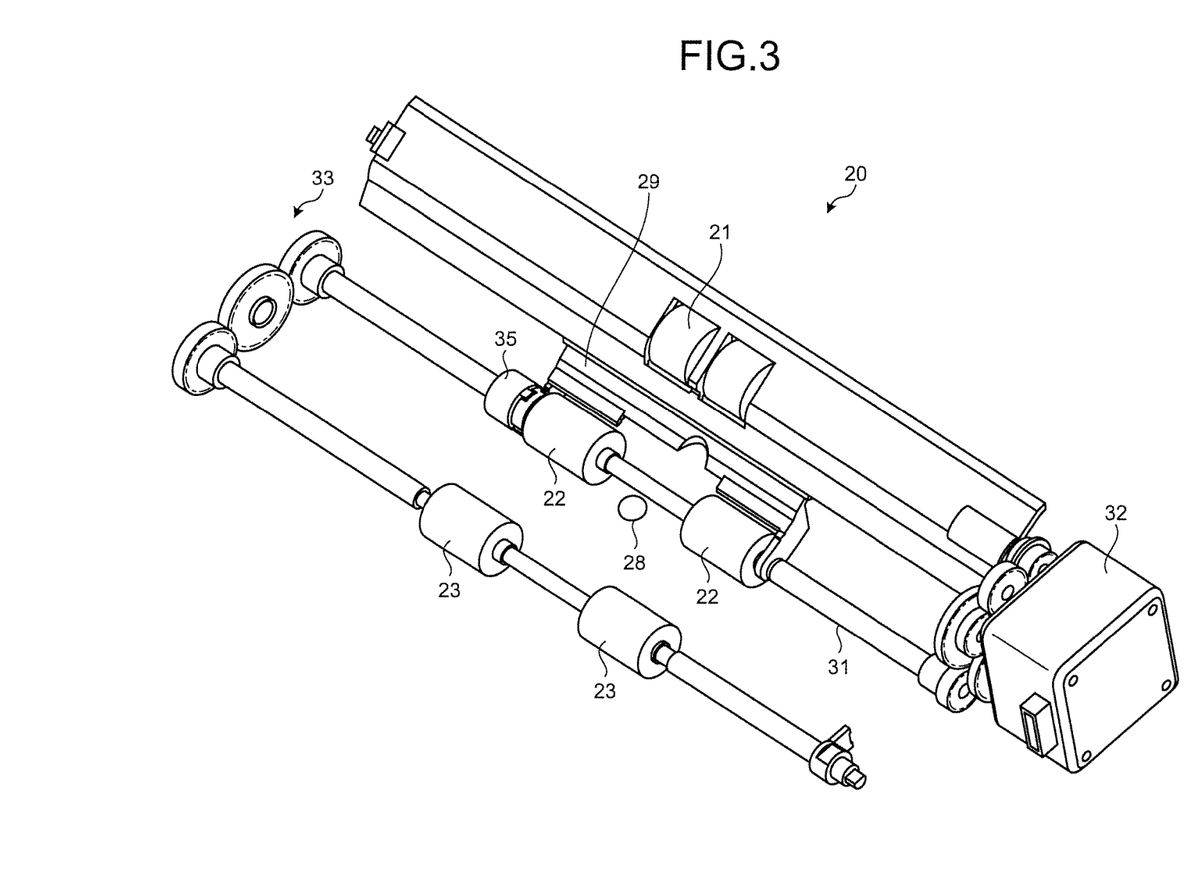
FIG. 3 is a perspective view of a feed unit.

FIG. 3 is a perspective view of the feed unit 20. As illustrated in FIG. 3, the feed unit 20 includes a transporting roller shaft 31, a motor 32, and a rotation transmitting mechanism 33. The transporting roller shaft 31 is formed in a rod-like shape and is rotatably supported by the lower frame 2. The motor 32 is supported by the lower frame 2 and allows the transporting roller shaft 31 to rotate in the normal direction or in the reverse direction. Being fixed to the transporting roller shaft 31, the first transporting roller 22 is rotatably supported by the lower frame 2. Therefore, the first transporting roller 22 rotates in the normal direction with the normal rotation of the transporting roller shaft 31 and rotates in the reverse direction with the reverse rotation of the transporting roller shaft 31. Herein, the feed path-switching flap 29 is rotatably supported by the transporting roller shaft 31, sharing a pivot with the transporting roller shaft 31 that rotates with respect to the lower frame 2. The rotation transmitting mechanism 33 transmits the rotation of the transporting roller shaft 31 to the second transporting roller 23. The normal rotation of the transporting roller shaft 31 allows the second transporting roller 23 to rotate in the normal direction, and the reverse rotation of the transporting roller shaft 31 allows the second transporting roller 23 to rotate in the reverse direction.

The image reading apparatus 10 further includes a rotation transmitting mechanism for separation (not illustrated) configured to transmit the rotation of the transporting roller shaft 31 to the separation unit 21. Therefore, the normal rotation of the transporting roller shaft 31 allows the separation unit 21 to separate one medium that is in contact with the placement surface 15 of the hopper 14 from a plurality of media inserted into the medium separating-feed path 16 from the separated port 7. When the transporting roller shaft 31 rotates in the normal direction, the separation unit 21 further feeds the separated medium from the separated port 7 toward the junction 12 through the medium separating-feed path 16.

Figure 4:
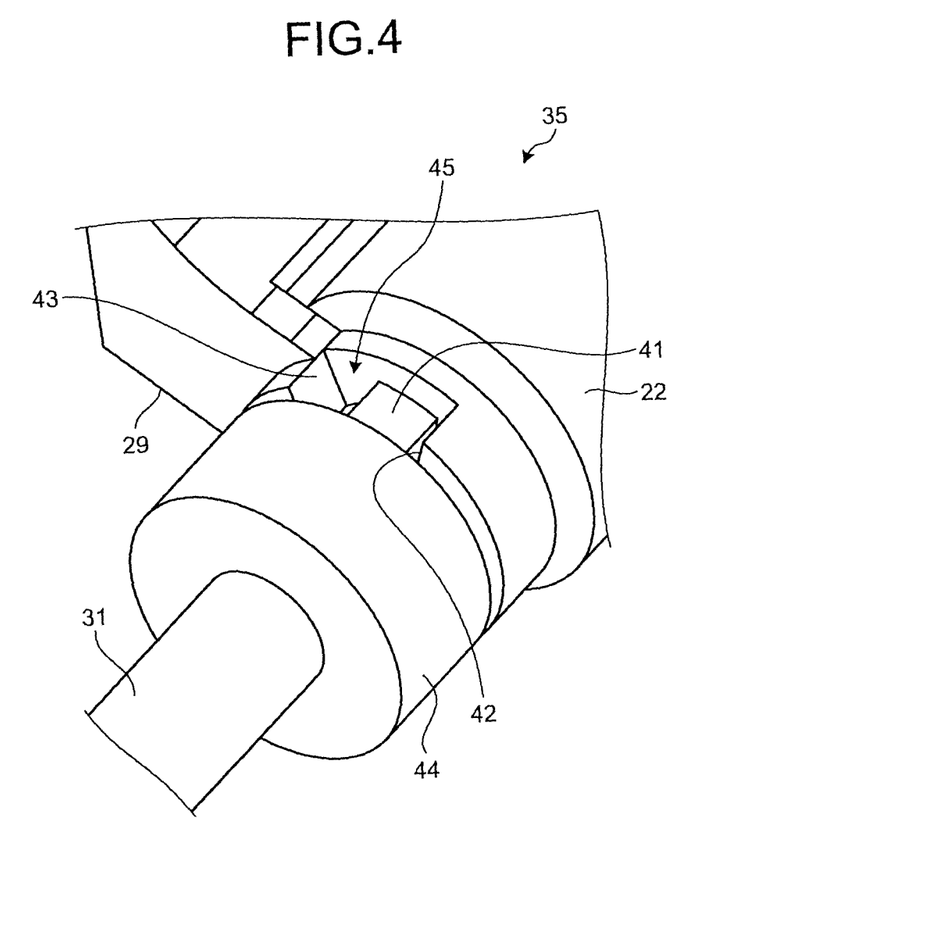
FIG. 4 is a perspective view of a flap drive unit.

The image reading apparatus 10 further includes a flap drive unit 35. FIG. 4 is a perspective view of the flap drive unit 35. As illustrated in FIG. 4, the flap drive unit 35 includes a first contact portion 41, a second contact portion 42, a third contact portion 43, and a torque limiter 44. The first contact portion 41 is rotatably supported by the transporting roller shaft 31, sharing a pivot with the transporting roller shaft 31. The second contact portion 42 and the third contact portion 43 are fixed to the feed path-switching flap 29. In other words, the second contact portion 42 and the third contact portion 43 are rotatably supported by the transporting roller shaft 31, sharing a pivot with the transporting roller shaft 31. When the second and the third contact portions 42 and 43 rotate, the rotation of the second and the third contact portions 42 and 43 is transmitted to the feed path-switching flap 29, and the feed path-switching flap 29 rotates in synchronization with the second and the third contact portions 42 and 43.

The first contact portion 41 is disposed between the second contact portion 42 and the third contact portion 43. The flap drive unit 35 is formed with a clearance 45 between the first contact portion 41 and the second contact portion 42 or between the first contact portion 41 and the third contact portion 43. In other words, the first contact portion 41 is apart from the third contact portion 43 when in contact with the second contact portion 42 and is apart from the second contact portion 42 when in contact with the third contact portion 43. Therefore, the first contact portion 41 is movable between the second contact portion 42 and the third contact portion 43.

The torque limiter 44 transmits the rotation of the transporting roller shaft 31 to the first contact portion 41. In other words, the normal rotation of the transporting roller shaft 31 allows the first contact portion 41 to rotate in the normal direction, and the reverse rotation of the transporting roller shaft 31 allows the first contact portion 41 to rotate in the reverse direction. Furthermore, when an absolute value of torque transmitted to the first contact portion 41 exceeds a predetermined value, the torque limiter 44 blocks the transmission of the rotation to the first contact portion 41.

Figure 5:
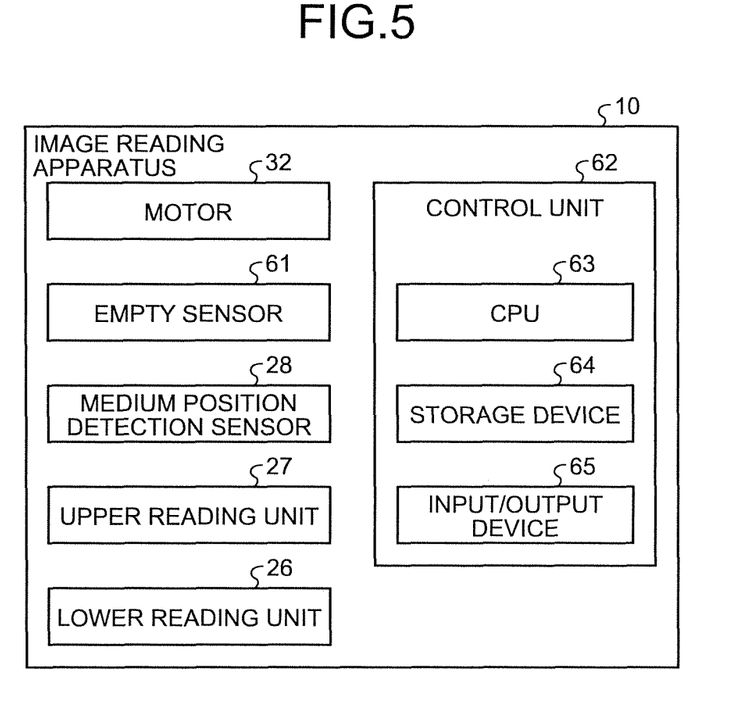
FIG. 5 is a block diagram of the image reading apparatus.

FIG. 5 is a block diagram of the image reading apparatus 10. As illustrated in FIG. 5, the image reading apparatus 10 further includes an empty sensor 61 and a control unit 62. Controlled by the control unit 62, the empty sensor 61 detects whether a medium is placed on the hopper 14.

The control unit 62 is a computer, including a central processing unit (CPU) 63, a storage device 64, and an input/output device 65. The CPU 63 executes a computer program installed in the control unit 62 so as to perform information processing and control the storage device 64 and the input/output device 65. The storage device 64 records the computer program and records information used by the CPU 63. Usable examples of the storage device 64 include any one, some, or all of a memory such as RAM and ROM, a fixed disk device such as a hard disk, a solid state drive (SSD), and an optical disk. The input/output device 65 includes a scan button and is configured to output information generated by user's operations to the CPU 63 and output the information generated by the CPU 63 so that the user recognizes the information. For example, the input/output device 65 includes the scan button and detects whether the scan button is pressed and outputs the detection result to the CPU 63.

Executing the computer program, the control unit 62 also controls the motor 32, the empty sensor 61, the medium position detection sensor 28, the lower reading unit 26, and the upper reading unit 27. In other words, the control unit 62 controls the empty sensor 61 so as to detect whether a medium is placed on the hopper 14. The control unit 62 controls the motor 32 so that the transporting roller shaft 31 rotates in the normal direction or the transporting roller shaft 31 rotates in the reverse direction. The control unit 62 controls the medium position detection sensor 28 so as to detect whether a medium is disposed at the medium detection position in the medium reading-feed path 17 and to detect the timing when an edge of the medium passes through the medium detection position. The control unit 62 controls the lower reading unit 26 and the upper reading unit 27 so that images on both sides of a medium fed through the medium reading-feed path 17 are read.

Operations of Image Reading Apparatus 10 of First Embodiment

Figure 6:
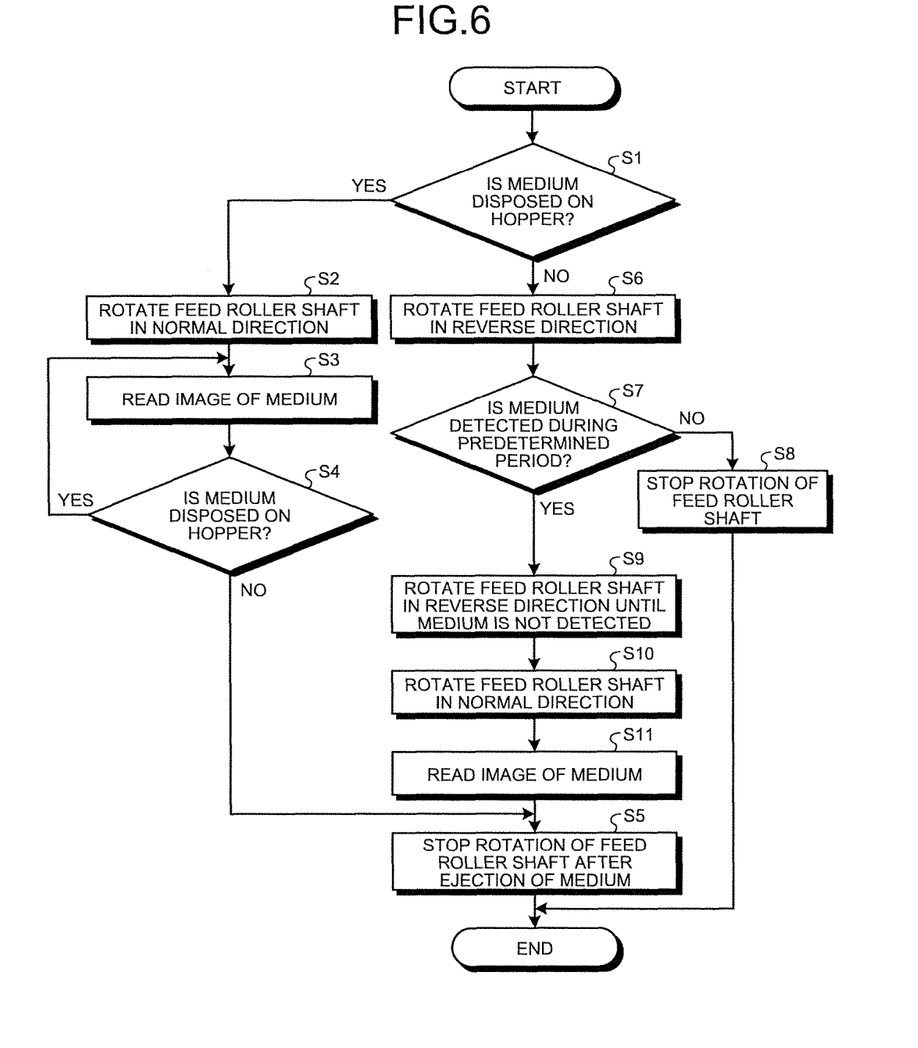
FIG. 6 is a flowchart of operations of the image reading apparatus.

FIG. 6 is a flowchart of operations of the image reading apparatus 10. When a user requires to read images of a plurality of thin media with the image reading apparatus 10, the user places the thin media on the hopper 14 and then presses the scan button. Each of the thin media is, for example, a single medium formed by a piece of paper not being stapled and separable from each other. Being placed on the hopper 14, the thin media are inserted into the separated port 7 by gravity and come into contact with the separation unit 21. When the user requires to read an image of a thick medium with the image reading apparatus 10, the user presses the scan button and inserts the thick medium into the unseparated port 8 so that the thick medium is sandwiched between the second transporting roller 23 and the second pressure roller 25. An example of the thick medium includes a brochure formed by stapling a single medium in plural.

When the image reading apparatus 10 is activated, the control unit 62 controls the input/output device 65 so as to detect whether the scan button is pressed. Detecting that the scan button is pressed, the control unit 62 controls the empty sensor 61 so as to detect whether a medium is placed on the hopper 14 (Step S1). Detecting that a medium is placed on the hopper 14 (Step S1, Yes), the control unit 62 controls the motor 32 and allows the transporting roller shaft 31 to rotate in the normal direction (Step S2).

The normal rotation of the transporting roller shaft 31 allows the separation unit 21 to separate one thin medium that is in contact with the placement surface 15 from the thin media placed on the hopper 14. The normal rotation of the transporting roller shaft 31 allows the separation unit 21 to further feed the separated thin medium from the separated port 7 toward the junction 12 through the medium separating-feed path 16.

When the transporting roller shaft 31 rotates in the normal direction, the flap drive unit 35 allows the feed path-switching flap 29 to rotate in the normal direction after a lapse of predetermined time from the beginning of the reverse rotation of the transporting roller shaft 31 so that the feed path-switching flap 29 is disposed at the separation feed position. In other words, when the transporting roller shaft 31 rotates in the normal direction, the torque limiter 44 of the flap drive unit 35 allows the first contact portion 41 to rotate in the normal direction. The first contact portion 41 comes into contact with the second contact portion 42 after a lapse of predetermined time from the beginning of the normal rotation of the first contact portion 41. After the first contact portion 41 contacts the second contact portion 42, the transporting roller shaft 31 rotates in the normal direction so that the torque limiter 44 allows the first contact portion 41 to rotate further in the normal direction. While the first contact portion 41 is in contact with the second contact portion 42, the feed path-switching flap 29 rotates in the normal direction with the normal rotation of the first contact portion 41. Rotating in the normal direction, the feed path-switching flap 29 is disposed at the separation feed position. Being disposed at the separation feed position, the feed path-switching flap 29 comes into contact with a part of the lower frame 2 so that the feed path-switching flap 29 is restricted from rotating in the normal direction. When the feed path-switching flap 29 is restricted from rotating in the normal direction, an absolute value of torque transmitted to the feed path-switching flap 29 exceeds a predetermined value so that the torque limiter 44 blocks the transmission of the rotation from the transporting roller shaft 31 to the first contact portion 41.

Being disposed at the separation feed position, the feed path-switching flap 29 isolates the medium drawing-feed path 18 from the junction 12 and guides, to the medium reading-feed path 17, one thin medium fed from the separated port 7 toward the junction 12 through the medium separating-feed path 16. Therefore, the thin medium fed by the separation unit 21 from the separated port 7 toward the junction 12 is fed to the medium reading-feed path 17 and sandwiched between the first transporting roller 22 and the first pressure roller 24.

When one thin medium is sandwiched between the first transporting roller 22 and the first pressure roller 24, the first pressure roller 24 presses the sandwiched thin medium against the first transporting roller 22. The first transporting roller 22 rotates in the normal direction with the normal rotation of the transporting roller shaft 31. Rotating in the normal direction, the first transporting roller 22 feeds, toward the unseparated port 8 through the medium reading-feed path 17, the thin medium pressed against the first transporting roller 22 by the first pressure roller 24.

After passing through the medium detection position, one thin medium fed by the first transporting roller 22 through the medium reading-feed path 17 toward the unseparated port 8 is fed between the lower reading unit 26 and the upper reading unit 27. When the transporting roller shaft 31 rotates in the normal direction, the control unit 62 controls the medium position detection sensor 28 so as to detect leading end-passing timing when a leading end of the thin medium passes through the medium detection position and to detect back end-passing timing when a back end of the thin medium passes through the medium detection position. During a reading period calculated based on those detected leading end-passing timing and back end-passing timing, the control unit 62 controls the lower reading unit 26 and the upper reading unit 27 so as to read images on both sides of the thin medium (Step S3). After passing between the lower reading unit 26 and the upper reading unit 27, the thin medium fed by the first transporting roller 22 toward the unseparated port 8 is disposed between the second transporting roller 23 and the second pressure roller 25.

When one thin medium is sandwiched between the second transporting roller 23 and the second pressure roller 25, the second pressure roller 25 presses the sandwiched thin medium against the second transporting roller 23. The second transporting roller 23 rotates in the normal direction with the normal rotation of the transporting roller shaft 31. Rotating in the normal direction, the second transporting roller 23 feeds, toward the unseparated port 8 through the medium reading-feed path 17, the thin medium sandwiched between the second transporting roller 23 and the second pressure roller 25, and the second transporting roller 23 ejects the thin medium from the unseparated port 8.

Detecting that a medium is placed on the hopper (Step S4, Yes), the control unit 62 repeatedly executes the process in Step S3 for the number of times equal to the number of the thin media, and the control unit 62 reads images on both sides of all the thin media. Detecting that no medium is placed on the hopper 14 (Step S4, No), the control unit 62 controls the motor 32 after all the thin media are ejected through the unseparated port 8 and stops the rotation of the transporting roller shaft 31 (Step S5).

Detecting that no medium is placed on the hopper 14 after the scan button is pressed (Step S1, No), the control unit 62 controls the motor 32 and allows the transporting roller shaft 31 to rotate in the reverse direction (Step S6). The reverse rotation of the transporting roller shaft 31 allows the second transporting roller 23 to rotate in the reverse direction and the first transporting roller 22 to rotate in the reverse direction.

When a thick medium is sandwiched between the second transporting roller 23 and the second pressure roller 25, the second pressure roller 25 presses the sandwiched thick medium against the second transporting roller 23. Rotating in the reverse direction, the second transporting roller 23 feeds, toward the junction 12 through the medium reading-feed path 17, the thick medium pressed against the second transporting roller 23 by the second pressure roller 25.

When the transporting roller shaft 31 rotates in the reverse direction, the control unit 62 controls the medium position detection sensor 28 so as to detect whether the medium passes through the medium detection position within a predetermined period from the beginning of the reverse rotation of the transporting roller shaft 31 (Step S7). Detecting that the medium does not pass through the medium detection position during the predetermined period (Step S7, No), the control unit 62 controls the motor 32 and stops the rotation of the transporting roller shaft 31 (Step S8). According to the processes in Steps S7 to S8, the image reading apparatus 10 prevents the transporting roller shaft 31 from continuously rotating in reverse direction when a thick medium is not appropriately fed in the medium reading-feed path 17.

Detecting that the thick medium passes through the medium detection position during the predetermined period (Step S7, Yes), the control unit 62 allows the transporting roller shaft 31 to continuously rotate in the reverse direction until the control unit 62 detects that the medium is not disposed at the medium detection position (Step S9). In other words, after passing through the medium detection position, the thick medium fed by the second transporting roller 23 through the medium reading-feed path 17 toward the junction 12 is sandwiched between the first transporting roller 22 and the first pressure roller 24. When the thick medium is sandwiched between the first transporting roller 22 and the first pressure roller 24, the first pressure roller 24 presses the sandwiched thick medium against the first transporting roller 22. The first transporting roller 22 rotates in the reverse direction with the reverse rotation of the transporting roller shaft 31. Rotating in the reverse direction, the first transporting roller 22 feeds, toward the junction 12 through the medium reading-feed path 17, the thick medium pressed against the first transporting roller 22 by the first pressure roller 24.

When the transporting roller shaft 31 rotates in the reverse direction, the flap drive unit 35 allows the feed path-switching flap 29 to rotate in the reverse direction right after the transporting roller shaft 31 starts rotating in the reverse direction so that the feed path-switching flap 29 is disposed at the switchback feed position. In other words, when the transporting roller shaft 31 rotates in the reverse direction, the torque limiter 44 of the flap drive unit 35 allows the first contact portion 41 to rotate in the reverse direction so that the first contact portion 41 is drawn apart from the second contact portion 42. The feed path-switching flap 29 rotates in the reverse direction with the reverse rotation of the first contact portion 41. Rotating in the reverse direction, the feed path-switching flap 29 is disposed at the switchback feed position. Being disposed at the switchback feed position, the feed path-switching flap 29 comes into contact with a part of the lower frame 2 so that the feed path-switching flap 29 is restricted from rotating in the reverse direction. After the feed path-switching flap 29 is disposed at the switchback feed position, the transporting roller shaft 31 rotates in the reverse direction so that the torque limiter 44 allows the first contact portion 41 to rotate further in the reverse direction. Rotating in the reverse direction, the first contact portion 41 comes into contact with the third contact portion 43. After the first contact portion 41 contacts the third contact portion 43, the absolute value of the torque transmitted to the first contact portion 41 from the transporting roller shaft 31 exceeds the predetermined value, so that the torque limiter 44 blocks the transmission of the rotation from the transporting roller shaft 31 to the first contact portion 41.

Figure 7:
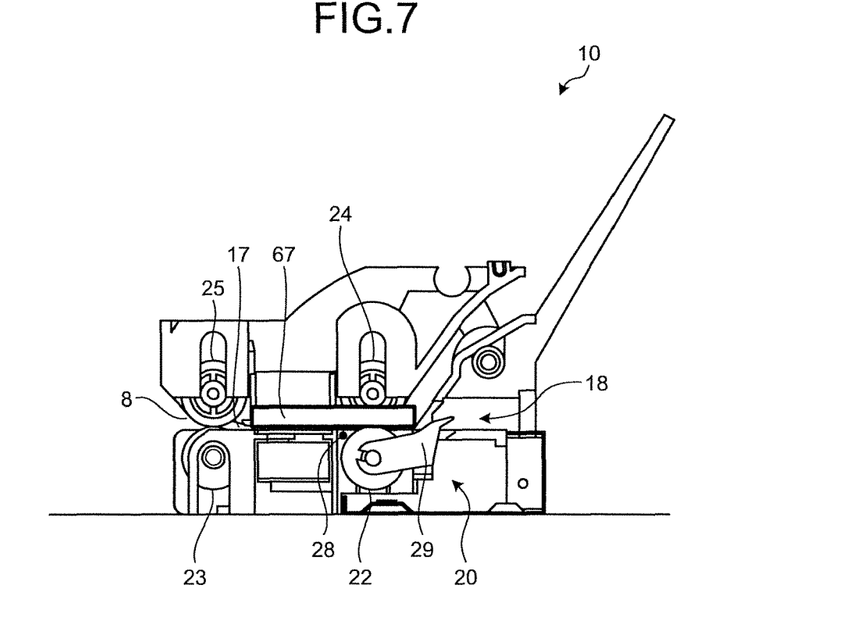
FIG. 7 is a sectional side view of the image reading apparatus when a thick medium is fed from an unseparated port toward a junction.

Being disposed at the switchback feed position, the feed path-switching flap 29 guides, to the medium drawing-feed path 18, the thick medium fed from the unseparated port 8 toward the junction 12 through the medium reading-feed path 17. FIG. 7 is a sectional side view of the image reading apparatus 10 when a thick medium 67 is fed from the unseparated port 8 toward the junction 12. As illustrated in FIG. 7, the feed path-switching flap 29 is disposed at the switchback feed position so that the thick medium 67 fed from the unseparated port 8 toward the junction 12 is guided to the medium drawing-feed path 18. Being fed toward the junction 12 by the first transporting roller 22, the thick medium 67 is fed to the medium drawing-feed path 18 and has a back end 68 drawn apart from the second transporting roller 23 and the second pressure roller 25.

Figure 8:
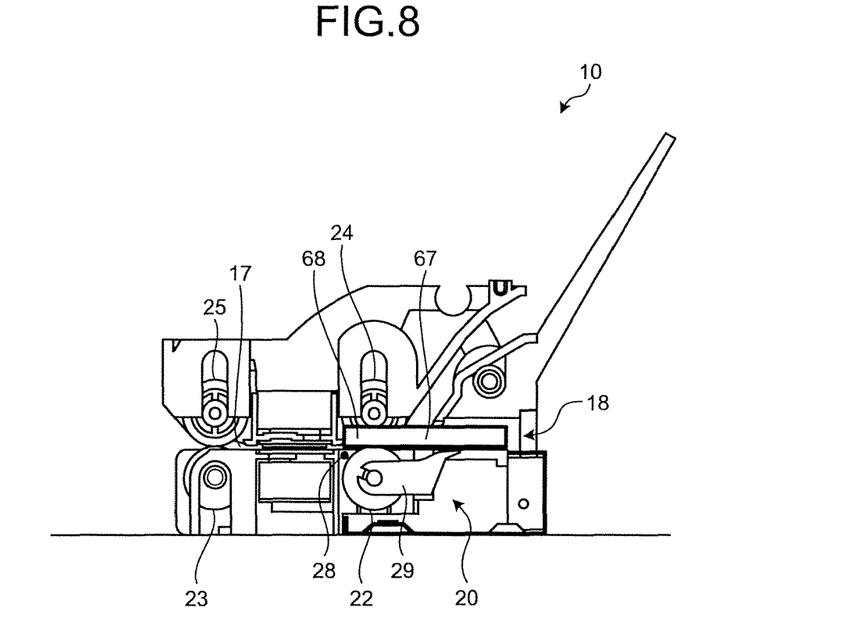
FIG. 8 is a sectional side view of the image reading apparatus when a back end of the thick medium passes through a medium detection position.

As illustrated in FIG. 8, the thick medium 67 is further fed toward the junction 12 by the first transporting roller 22 so that the back end 68 passes through the medium detection position. FIG. 8 is a sectional side view of the image reading apparatus 10 when the back end 68 of the thick medium 67 passes through the medium detection position. Controlling the medium position detection sensor 28, the control unit 62 detects the back end-passing timing when the back end 68 of the thick medium 67 passes through the medium detection position. Controlling the motor 32, the control unit 62 stops the rotation of the transporting roller shaft 31 right after the detected back end-passing timing. When the transporting roller shaft 31 stops rotating right after the back end-passing timing, the thick medium 67 stops while being sandwiched between the first transporting roller 22 and the first pressure roller 24.

Figure 9:
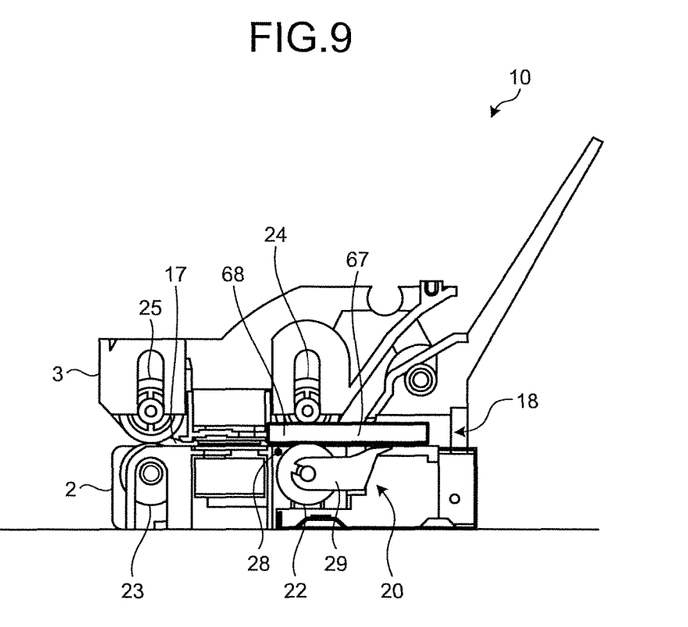
FIG. 9 is a sectional side view of the image reading apparatus when the thick medium is fed from the junction toward the unseparated port.

After the transporting roller shaft 31 stops rotating, the control unit 62 controls the motor 32 and allows the transporting roller shaft 31 to rotate in the normal direction (Step S10). Rotating in the normal direction, the first transporting roller 22 feeds, to the unseparated port 8 through the medium reading-feed path 17, the thick medium 67 pressed against the first transporting roller 22 by the first pressure roller 24. FIG. 9 is a sectional side view of the image reading apparatus 10 when the thick medium 67 is fed from the junction 12 toward the unseparated port 8. Being fed toward the unseparated port 8 through the medium reading-feed path 17, the thick medium 67 is fed between the lower reading unit 26 and the upper reading unit 27 after passing through the medium detection position. Furthermore, when the transporting roller shaft 31 rotates in the normal direction, the control unit 62 controls the medium position detection sensor 28 so as to detect the leading end-passing timing and back end-passing timing when both ends of the thick medium 67 pass through the medium detection position. During a reading period calculated based on those detected leading end-passing timing and back end-passing timing, the control unit 62 controls the lower reading unit 26 and the upper reading unit 27 so as to read images on both sides of the thick medium 67 (Step S11). Being fed toward the unseparated port 8 by the first transporting roller 22, the thick medium 67 passes between the lower reading unit 26 and the upper reading unit 27 and is then sandwiched between the second transporting roller 23 and the second pressure roller 25.

When the thick medium 67 is sandwiched between the second transporting roller 23 and the second pressure roller 25, the second pressure roller 25 presses the thick medium 67 against the second transporting roller 23. The normal rotation of the transporting roller shaft 31 allows the second transporting roller 23 to rotate in the normal direction and the second pressure roller 25 to rotate in the normal direction. The second transporting roller 23 and the second pressure roller 25 rotate in the normal direction so as to feed the thick medium 67 toward the unseparated port 8 through the medium reading-feed path 17.

Figure 10:
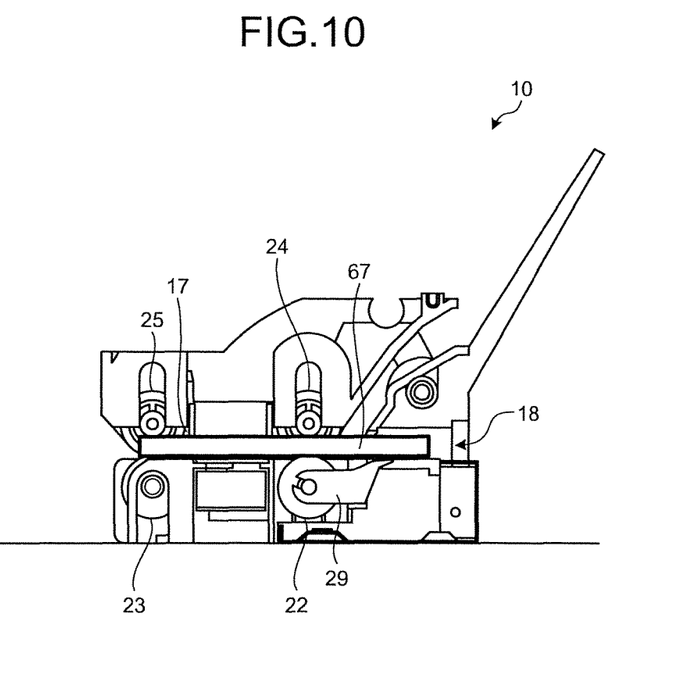
FIG. 10 is a sectional side view of the image reading apparatus when a thick medium is sandwiched between a second transporting roller and a second pressure roller.

FIG. 10 is a sectional side view of the image reading apparatus 10 when the thick medium 67 is sandwiched between the second transporting roller 23 and the second pressure roller 25. When the thick medium 67 is sandwiched between the second transporting roller 23 and the second pressure roller 25, the feed path-switching flap 29 is disposed at the switchback feed position as illustrated in FIG. 10. In other words, after the thick medium 67 is sandwiched between the second transporting roller 23 and the second pressure roller 25, the flap drive unit 35 transmits the reverse rotation of the transporting roller shaft 31 to the feed path-switching flap 29.

Such an operation does not allow the thick medium 67 to pass through the separation unit 21, which prevents a trouble such as a turned-up medium. Furthermore, the thick medium 67 being fed through the medium reading-feed path 17 and the medium drawing-feed path 18 reduces the extent of curvature of the thick medium 67 when being fed therethrough.

Interference of the feed path-switching flap 29 with the thick medium 67 causes resistance to the thick medium 67 being fed through the medium reading-feed path 17 toward the unseparated port 8. Therefore, the speed at which the thick medium 67 is fed through the medium reading-feed path 17 may fluctuate when the feed path-switching flap 29 interferes with the thick medium 67. The image reading apparatus 10 delays the timing at which the feed path-switching flap 29 starts rotating in the reverse direction when the thick medium 67 is fed from the medium drawing-feed path 18 to the medium reading-feed path 17. Delaying the timing avoids the interference of the feed path-switching flap 29 with the thick medium 67. Avoiding the interference of the feed path-switching flap 29 with the thick medium 67 enables the image reading apparatus 10 to reduce fluctuations in speed at which the thick medium 67 is fed through the medium reading-feed path 17.

In the image reading apparatus 10, when the thick medium 67 is fed by only the first transporting roller 22, even relatively small resistance to the thick medium 67 may greatly fluctuate the speed at which the thick medium 67 is fed. When the thick medium 67 is fed by the first transporting roller 22 and the second transporting roller 23, even with relatively large resistance to the thick medium 67, the image reading apparatus 10 is capable of feeding the thick medium 67 appropriately against the resistance. Since the feed path-switching flap 29 is configured to interfere with the thick medium 67 fed by the first transporting roller 22 and the second transporting roller 23, the image reading apparatus 10 is capable of reducing the fluctuations in speed at which the thick medium 67 is fed. Reducing the fluctuations in speed at which the thick medium 67 is fed through the medium reading-feed path 17, the image reading apparatus 10 appropriately reads the images of the thick medium 67.

Effects of Image Reading Apparatus 10

The image reading apparatus 10 according to the first embodiment includes the junction 12, the lower reading unit 26, the upper reading unit 27, the feed path-switching flap 29, and the flap drive unit 35. At the junction 12, the medium reading-feed path 17, the medium separating-feed path 16, and the medium drawing-feed path 18 join together. The lower and the upper reading units 26 and 27 read images of a medium fed through the medium reading-feed path 17. Being disposed at the separation feed position, the feed path-switching flap 29 isolates the medium drawing-feed path 18 from the junction 12 and guides the medium to the medium reading-feed path 17 from the medium separating-feed path 16. Being disposed at the switchback feed position, the feed path-switching flap 29 guides the medium to the medium drawing-feed path 18 from the medium reading-feed path 17. When the medium is fed from the medium reading-feed path 17 toward the medium drawing-feed path 18, the flap drive unit 35 moves the feed path-switching flap 29 to the switchback feed position. Furthermore, the flap drive unit 35 moves the feed path-switching flap 29 to the separation feed position at another timing after a lapse of predetermined time from the beginning of feeding the medium from the medium drawing-feed path 18 toward the medium reading-feed path 17. The image reading apparatus 10 is capable of reducing an adverse effect on the medium attributed to the interference of the feed path-switching flap 29 with the medium fed to the medium reading-feed path 17 by switchback feed after the medium is fed from the medium reading-feed path 17 to the medium drawing-feed path 18. Examples of the adverse effect include fluctuations in speed at which the medium is fed, and deformation of the medium. Reducing fluctuations in speed at which the medium is fed, the image reading apparatus 10 is capable of appropriately reading the images of the medium.

The image reading apparatus 10 of the first embodiment further includes the first transporting roller 22. The first transporting roller 22 rotates in the normal rotation so as to feed the medium disposed in the medium reading-feed path 17 is drawn apart from the junction 12, and rotates in the reverse rotation so as to feed the medium disposed in the medium reading-feed path 17 toward the junction 12. The flap drive unit 35 moves the feed path-switching flap 29 to the switchback feed position when the first transporting roller 22 rotates in reverse rotation. The flap drive unit 35 transmits the rotation of the first transporting roller 22 to the feed path-switching flap 29 at another timing after a lapse of predetermined time from the beginning of the normal rotation of the first transporting roller 22 so as to move the feed path-switching flap 29 to the separation feed position. The image reading apparatus 10 includes less number of components and is manufactured in a manner simpler than other image reading apparatuses provided with a drive source that rotates the first transporting roller 22 and a drive source that moves the feed path-switching flap 29 separately.

In addition, the feed path-switching flap 29 of the image reading apparatus 10 according to the first embodiment is rotatably supported, sharing the pivot with the first transporting roller 22. The flap drive unit 35 includes the first contact portion 41 to which the rotation is transmitted from the first transporting roller 22, and the second contact portion 42 which transmits the rotation to the feed path-switching flap 29. The rotation of the first transporting roller 22 is transmitted to the feed path-switching flap 29 when the first contact portion 41 comes into contact with the second contact portion 42. The flap drive unit 35 is formed with the clearance 45 between the first contact portion 41 and the second contact portion 42 so that the first contact portion 41 comes into contact with the second contact portion 42 at another timing after a lapse of predetermined time from the beginning of the normal rotation of the first transporting roller 22. Since the feed path-switching flap 29 shares the pivot with the first transporting roller 22, the feed path-switching flap 29 is supported by a simple structure, and the image reading apparatus 10 is manufactured in a simple manner. Furthermore, since the feed path-switching flap 29 shares the pivot with the first transporting roller 22, the flap drive unit 35 is formed in a simple structure, and the image reading apparatus 10 is manufactured in a simple manner.

The image reading apparatus 10 according to the first embodiment further includes the second transporting roller 23 that feeds a medium disposed in the medium reading-feed path 17. The flap drive unit 35 is formed in such a manner that the feed path-switching flap 29 moves to the separation feed position after the second transporting roller 23 feeds the medium fed from the medium drawing-feed path 18 to the medium reading-feed path 17. The interference of the feed path-switching flap 29 with the medium causes resistance to the medium being fed through the medium reading-feed path 17 toward the unseparated port 8. Therefore, when the feed path-switching flap 29 interferes with the medium and when the medium is fed by the first transporting roller 22, the speed at which the medium is fed through the medium reading-feed path 17 may fluctuate. Since the medium is fed by the first transporting roller 22 and the second transporting roller 23 when the feed path-switching flap 29 interferes with the medium, the image reading apparatus 10 is capable of reducing the fluctuations in speed at which the medium is fed through the medium reading-feed path 17. Reducing the fluctuations in speed at which the medium is fed through the medium reading-feed path 17, the image reading apparatus 10 is capable of reading images of the medium appropriately.

The flap drive unit 35 of the image reading apparatus 10 of the first embodiment may move the feed path-switching flap 29 to the separation feed position before the medium fed from the medium drawing-feed path 18 to the medium reading-feed path 17 is fed by the second transporting roller 23. The timing when the feed path-switching flap 29 moves to the separation feed position may be, for example, when a back end of a medium having a predetermined length passes through the junction 12 at the time of switchback feed of the medium. Even in that case, the image reading apparatus 10 of the first embodiment is capable of reducing an adverse effect on a medium shorter than the predetermined length which is attributed to the interference of the feed path-switching flap 29 with the medium. The timing when the feed path-switching flap 29 moves to the separation feed position is adjustable by changing the dimension of the clearance 45.

The flap drive unit 35 of the image reading apparatus 10 of the first embodiment further includes the torque limiter 44. When the first transporting roller 22 rotates in the normal direction and when the absolute value of the torque applied to the feed path-switching flap 29 is equal to or larger than the predetermined value, the torque limiter 44 blocks the transmission of the rotation from the first transporting roller 22 to the feed path-switching flap 29. Being provided with the torque limiter 44, the image reading apparatus 10 appropriately places the feed path-switching flap 29 at the separation feed position or at the switchback feed position without damaging the feed path-switching flap 29 or the flap drive unit 35. Furthermore, the image reading apparatus 10 prevents the feed path-switching flap 29 from interfering the medium fed through the junction 12 with a force equal to or larger than a predetermined value and reduces the adverse effect on the medium attributed to the feed path-switching flap 29.

Second Embodiment

Figure 11:
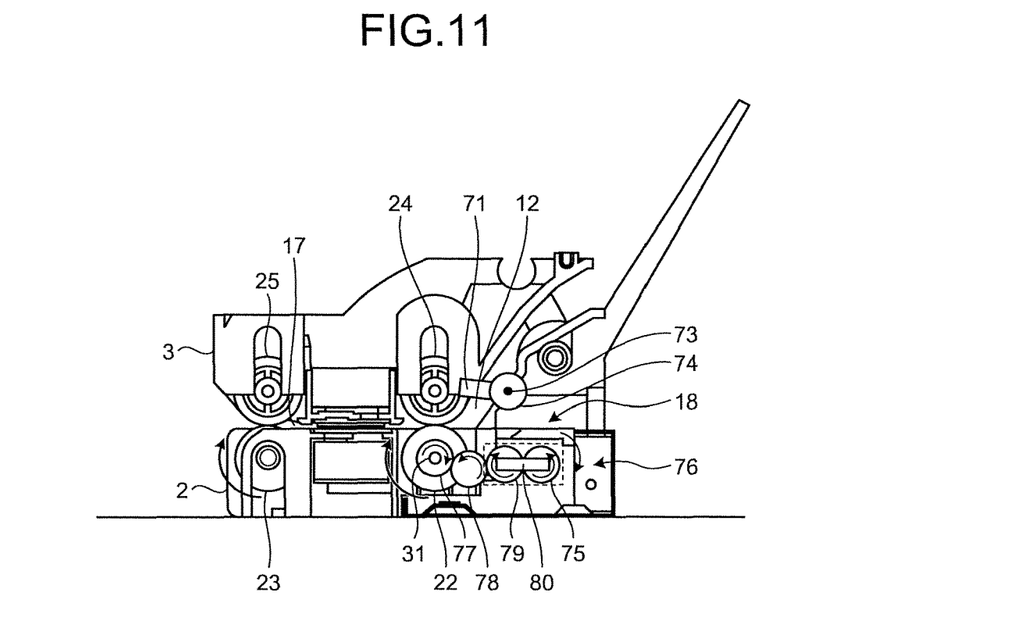
FIG. 11 is a sectional side view of an image reading apparatus according to a second embodiment.

An image reading apparatus of a second embodiment is similar to the image reading apparatus 10 of the first embodiment except that, as illustrated in FIG. 11, the feed path-switching flap 29 is replaced by another feed path-switching flap 71 and the flap drive unit 35 is replaced by another flap drive unit 72. FIG. 11 is a sectional side view of the image reading apparatus according to the second embodiment. The feed path-switching flap 71 is supported by the lower frame 2, being rotatable about a pivot 73 so as to be disposed at the separation feed position and at the switchback feed position. The pivot 73 is disposed on the upper side of the medium drawing-feed path 18 and is parallel to the pivot of the first transporting roller 22. Being disposed at the separation feed position, the feed path-switching flap 71 isolates the medium drawing-feed path 18 from the junction 12 and guides, to the medium reading-feed path 17, a medium fed from the separated port 7 to the junction 12 through the medium separating-feed path 16.

The flap drive unit 72 includes a first gear 74, a second gear 75, and a planetary gear unit 76. The first gear 74 is formed in a disc-like shape, and a plurality of teeth are formed on the outer periphery of the first gear 74 and fixed to the feed path-switching flap 71. The second gear 75 is formed in a disc-like shape, and a plurality of teeth are formed on the outer periphery of the second gear 75. The planetary gear unit 76 includes a third gear 77, a fourth gear 78, a fifth gear 79, and a support member 80. The third gear 77 is formed in a disc-like shape, and a plurality of teeth are formed on the outer periphery of the third gear 77 and fixed to the transporting roller shaft 31. The fourth gear 78 is formed in a disc-like shape, being rotatably supported by the lower frame 2, and a plurality of teeth are formed on the outer periphery of the fourth gear 78. The teeth included in the fourth gear 78 engage with the teeth included in the third gear 77. The fifth gear 79 is formed in a disc-like shape, being rotatably supported by the lower frame 2, and a plurality of teeth are formed on the outer periphery of the fifth gear 79. The teeth included in the fifth gear 79 engage with the teeth included in the fourth gear 78. The support member 80 is rotatably supported by the lower frame 2, sharing a pivot with the fifth gear 79 so as to be disposed at a separation position or a fitting position. The rotation of the fifth gear 79 is transmitted to the support member 80 through a torque limiter (not illustrated). Herein, the second gear 75 is disposed so that the teeth in the second gear 75 engage with the teeth in the fifth gear 79, and the second gear 75 is rotatably supported by the support member 80. When the support member 80 is disposed at the separation position, the second gear 75 is separated from the first gear 74 so that the teeth in the second gear 75 do not engage with the teeth in the first gear 74.

The flap drive unit 72 further includes a torsion coil spring (not illustrated). The torsion coil spring applies an elastic force to the feed path-switching flap 71 so that the feed path-switching flap 71 moves from the separation feed position to the switchback feed position. The torque applied by the elastic force of the torsion coil spring to the feed path-switching flap 71 is smaller than a predetermined value at which the torque limiter 44 blocks the transmission of the rotation from the transporting roller shaft 31 to the first contact portion 41.

Figure 12:
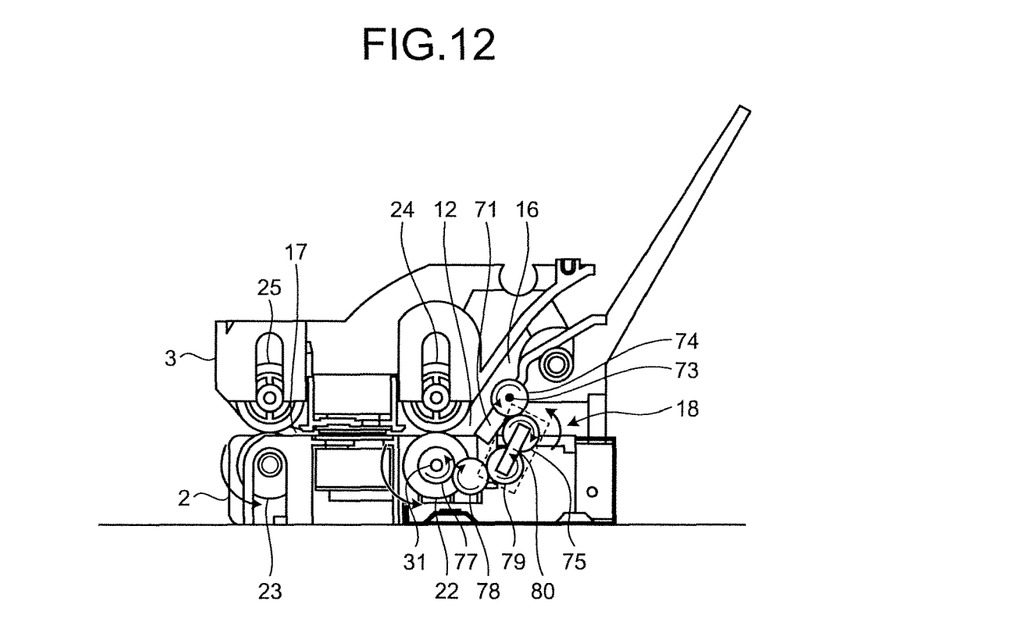
FIG. 12 is a sectional side view of the image reading apparatus of the second embodiment when a support member is disposed at a fitting position.

FIG. 12 is a sectional side view of the image reading apparatus of the second embodiment when the support member 80 is disposed at the fitting position. Rotating in the normal direction (counterclockwise in FIG. 12) from the separation position, the support member 80 is disposed at the fitting position as illustrated in FIG. 12. When the support member 80 is disposed at the fitting position, the second gear 75 comes into contact with the first gear 74 so that the teeth in the second gear 75 engage with the teeth in the first gear 74. Being disposed at the fitting position, the support member 80 comes into contact with a part of the lower frame 2 and is restricted from moving so as not to rotate in the normal direction from the fitting position. Rotating in the reverse direction from the fitting position, the support member 80 is disposed at the separation position as illustrated in FIG. 11. Being disposed at the fitting position, the support member 80 comes into contact with a part of the upper frame 3 and is restricted from moving so as not to rotate further in the reverse direction from the fitting position.

Operations of Flap Drive Unit 72

With the reverse rotation of the transporting roller shaft 31, the flap drive unit 72 allows the feed path-switching flap 71 to rotate in the reverse direction right after the transporting roller shaft 31 starts rotating in the reverse direction and places the feed path-switching flap 29 at the switchback feed position. In other words, the third gear 77 of the planetary gear unit 76 rotates in the reverse direction (clockwise in FIG. 11) with the reverse rotation of the transporting roller shaft 31. When the third gear 77 rotates in the reverse direction, the fourth gear 78 engages with the third gear 77 so as to rotate in the reverse direction (counterclockwise in FIG. 11). When the fourth gear 78 rotates in the reverse direction, the fifth gear 79 engages with the fourth gear 78 so as to rotate in the reverse direction (clockwise in FIG. 11). When the fifth gear 79 rotates in the reverse direction, the support member 80 rotates in the reverse direction (clockwise in FIG. 11) through the torque limiter and is disposed at the separation position. When the fifth gear 79 rotates in the reverse direction, the second gear 75 engages with the fifth gear 79 so as to rotate in the reverse direction (counterclockwise in FIG. 11). Furthermore, when the support member 80 rotates in the reverse direction, the second gear 75 is separated from the first gear 74 so as not to engage with the first gear 74. When the second gear 75 is separated from the first gear 74, the feed path-switching flap 71 rotates in the reverse direction by the elastic force applied from the torsion coil spring of the flap drive unit 72 and is disposed at the switchback feed position.

With the normal rotation of the transporting roller shaft 31, the flap drive unit 72 allows the feed path-switching flap 71 to rotate in the normal direction after a lapse of predetermined time from the beginning of the reverse rotation of the transporting roller shaft 31 and places the feed path-switching flap 29 at the separation feed position. In other words, the third gear 77 of the planetary gear unit 76 rotates in the normal direction (counterclockwise in FIG. 12) with the normal rotation of the transporting roller shaft 31. When the third gear 77 rotates in the normal direction, the fourth gear 78 engages with the third gear 77 so as to rotate in the normal direction (clockwise in FIG. 12). When the fourth gear 78 rotates in the normal direction, the fifth gear 79 engages with the fourth gear 78 so as to rotate in the normal direction (counterclockwise in FIG. 12). When the fifth gear 79 rotates in the normal direction, the support member 80 rotates in the normal direction (counterclockwise in FIG. 12) through the torque limiter and is disposed at the fitting position. When the fifth gear 79 rotates in the normal direction, the second gear 75 engages with the fifth gear 79 so as to rotate in the normal direction (clockwise in FIG. 12). Furthermore, when the support member 80 rotates in the normal direction, the second gear 75 approaches the first gear 74 so as to engage with the first gear 74. After being in engage with the second gear 75, the first gear 74 rotates in the normal direction. When the first gear 74 rotates in the normal direction, the feed path-switching flap 71 rotates in the normal direction against the elastic force from the torsion coil spring of the flap drive unit 72 and is disposed at the separation feed position. When the second gear 75 engages with the first gear 74 at a second timing after a lapse of predetermined time from a first timing at which the transporting roller shaft 31 starts rotating in the reverse direction, the flap drive unit 72 allows the feed path-switching flap 71 to start rotating in the normal direction at the second timing. In other words, as similar to the operation in which the flap drive unit 35 of the image reading apparatus 10 of the first embodiment drives the feed path-switching flap 29, the flap drive unit 72 drives the feed path-switching flap 71.

Similarly to the image reading apparatus 10 of the first embodiment, the image reading apparatus according to the second embodiment carries out the operations illustrated in the flowchart of FIG. 6. Similarly to the image reading apparatus 10 of the first embodiment, the image reading apparatus according to the second embodiment is capable of delaying the timing at which the feed path-switching flap 71 moves from the switchback feed position to the separation feed position when feeding a medium from the medium drawing-feed path 18 to the medium reading-feed path 17. Accordingly, similarly to the image reading apparatus 10 of the first embodiment, the image reading apparatus according to the second embodiment is capable of reducing the adverse effect attributed to the interference of the feed path-switching flap 71 with the medium.

An image reading apparatus according to an aspect of the present disclosure enables appropriate switchback feed of a medium.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:
1. An image reading apparatus comprising:
 a junction where a first feed path, a second feed path, and a third feed path join together;
 a reading unit configured to read an image of a medium fed through the first feed path;
 a switching unit that isolates the third feed path from the junction so as to guide the medium from the second feed path to the first feed path when being disposed at a first position and that guides the medium from the first feed path to the third feed path when being disposed at the second position;

a first transporting roller that rotates in a first direction so as to feed the medium disposed in the first feed path apart from the junction and that rotates in a second direction opposite to the first direction so as to feed the medium disposed in the first feed path toward the junction; and a drive unit that moves the switching unit to the second position when the first transporting roller rotates in the second direction, wherein the drive unit transmits a rotation of the first transporting roller to the switching unit so as to move the switching unit to the first position after a lapse of predetermined time from when the first transporting roller starts rotating in the first direction.

2. The image reading apparatus according to claim 1, wherein the switching unit is rotatably supported, sharing a pivot with the first transporting roller, and wherein the drive unit includes:
   a first contact portion to which the rotation of the first transporting roller is transmitted; and
   a second contact portion which transmits the rotation to the switching unit, wherein the rotation of the first transporting roller is transmitted to the switching unit when the first contact portion comes into contact with the second contact portion, and wherein the drive unit is formed with a clearance between the first contact portion and the second contact portion so that the first contact portion comes into contact with the second contact portion after a lapse of predetermined time from when the first transporting roller starts rotating in the first direction.

3. The image reading apparatus according to claim 1, wherein the switching unit is supported rotatably about another pivot different from the pivot about which the first transporting roller rotates, and wherein the drive unit includes:
   a first gear which transmits the rotation to the switching unit;
   a second gear to which the rotation is transmitted from the first transporting roller; and
   a mechanism configured to draw the second gear apart from the first gear when the first transporting roller rotates in the second direction so that the second gear does not engage with the first gear and configured to allow the second gear to approach the first gear when the first transporting roller rotates in the first direction so that the second gear engages with the first gear.

4. The image reading apparatus according to claim 1, further comprising:
   a second transporting roller that feeds a medium in the first feed path, wherein the drive unit is formed in such a manner that the switching unit moves to the first position after the second transporting roller feeds the medium fed by the first transporting roller rotating in the first direction.

5. The image reading apparatus according to claim 1, wherein the drive unit further includes a torque limiter that blocks transmission of the rotation from the first transporting roller to the switching unit when the first transporting roller rotates in the first direction and when a load applied to the switching unit is equal to or more than a predetermined value.

\* \* \* \* \*